UNITED STATES PATENT OFFICE.

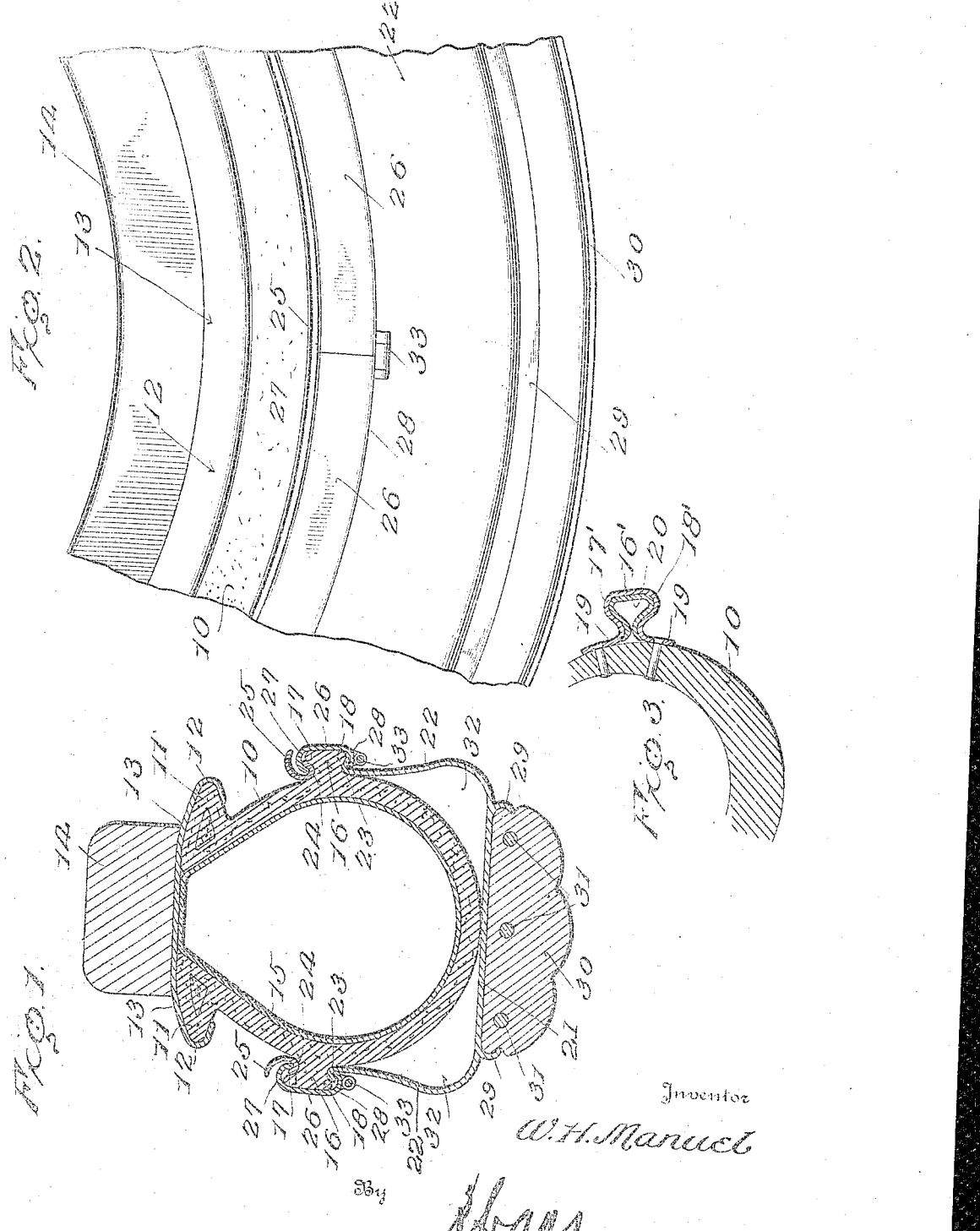

WILLIAM H. MANUEL, OF TERRE HAUTE, INDIANA, ASSIGNOR OF ONE-HALF TO JAMES A. CHANDLER, OF TERRE HAUTE, INDIANA.

ARMOR FOR PNEUMATIC TIRES.

1,268,258.

Specification of Letters Patent.

Patented June 4, 1918.

Application filed December 31, 1917. Serial No. 269,659.

*To all whom it may concern:*

Be it known that I, WILLIAM H. MANUEL, a citizen of the United States, residing at Terre Haute, in the county of Vigo and State of Indiana, have invented certain new and useful Improvements in Armor for Pneumatic Tires, of which the following is a specification.

This invention relates to improvements in protectors or shields for pneumatic tires, to prevent danger of puncturing the tire without reducing the resiliency.

Another object of the invention is to provide a device which may be attached without material structural change to the tire casings already manufactured, or to be embodied in the tire casing as an integral part thereof, and readily attached to tire casings of various sizes and forms, and tire casings constructed from any required material.

With these and other objects in view, the invention consists in certain novel features of construction, as hereinafter shown and described and then specifically pointed out in the claims; and in the drawings illustrative of the preferred embodiment of the invention—

Figure 1 is a transverse section of a tire casing including the felly of the wheel with the improvement applied.

Fig. 2 is a side elevation of a portion of the structure disclosed in Fig. 1.

Fig. 3 is a sectional detail illustrating a modification in the construction.

The improved device may be applied to tire casings of various sizes and forms, and to tire casings constructed of any of the usual materials employed for this purpose, and for the purpose of illustration the device is shown applied to a conventional form of casing represented as a whole at 10 and provided with the usual beads 11 engaged by the clencher portions 12 of the rim 13, the latter mounted in the usual manner upon the felly 14. The inner or inflatable tube is represented at 15. Formed upon or attached to the side faces of the casing 10 are circumferentially arranged ribs 16, the ribs having annular projections 17 and 18 as shown. The ribs 16 may be formed integral with the casing 10 as shown in Figs. 1 and 2, and which will preferably be the arrangement employed when the casing is originally constructed. If the improved device is to be applied to casings already constructed the arrangement shown in Fig. 3 will be employed with ribs 16', which corresponds to the ribs 16 and 17, and constructed from sheet metal pressed or otherwise formed into the required shape and including projections 17' and 18' corresponding to the projections 17 and 18, the ribs 16' also having relatively long base flanges 19 secured to the tire casing by rivets or other fastening devices. When constructed as shown in Fig. 3 the interior of the rib will be reinforced by an annular metal member indicated at 20 and pressed or otherwise formed in the required shape.

The ribs are designed to support the shield or guard in position upon the tire casing.

The shield or guard is formed from metal, preferably steel, bent to the required shape and comprises a base or tread portion 21 and side portions 22, the latter terminating in hook shaped terminals as shown at 23, and engaging in the space between the adjacent rib 18 and the body of the casing. The shield member 21—22 extends entirely around the casing and is continuous or annular in outline.

Bearing around the tire casing at each side is an annular supporting member including a relatively small curved portion 24 engaging between the rib 17 and the body of the casing and with a relatively large transverse curved portion 25. Bearing over each of the ribs 16 and its projections or ribs 17 and 18 is an annular holding member comprising an intermediate body portion 26 and bead portion 27—28. The bead portion 28 engages the outer edge of the turned over portions 23 of the guard or shield while the bead portion 27 engages over the rib portion 24 of the holding member. By this arrangement the shield or guard member 21—22 is firmly supported in position relative to the casing 10, and prevented from displacement under the severe strains to which it will be subjected when in use, while at the same time the relatively soft material of the casing is protected from abrasion by the bead portions 27 of the member 26.

Formed upon the base portion 21 of the shield or guard are annular inturned holding ribs 29 to support an annular bearing member or tread portion 30, the latter preferably formed into a group of annular ribs or projections, to increase the grip. The member 30 is likewise preferably reinforced by wire members 31 embedded in the material of the tread. The member 30 will preferably be formed of rubber or like material, of the same consistency as usually employed for the tread portion of the tire casing.

When originally constructed the tire casing will preferably be of uniform thickness throughout, as shown in Fig. 1 and will not be increased in thickness as in ordinary tire casings.

When the improved device is applied to tire casings already constructed the increased thickness of the tire casing will not interfere with the application of the improvement thereto, as illustrated in Fig. 3.

The application of the improved device materially strengthens and reinforces the tire casing and correspondingly increases its durability without materially increasing the weight.

As shown in Fig. 1 the portion 21 of the shield extends in a straight line transversely of the casing so that relatively large spaces 32 are left between the casing and the sides 22 of the shield into which the casing is free to expand. Thus the presence of the guard or shield does not lessen the resiliency of the tire.

The annular holding member 26 is united at its ends by a suitable coupling illustrated at 33.

Having thus described the invention, what is claimed as new is:

1. A tire casing having annular holding ribs provided with projecting beads, an annular shield bearing over said casing and having outturned edges respectively engaging said beads, and annular holding members having inwardly turned edges respectively engaging over the beads of the holding ribs and the outturned edges of the shield.

2. A tire casing having annular holding ribs provided with projecting beads, an annular shield bearing over said casing and having outturned edges respectively engaging said beads, annular locking members each having a lip engaging one of said beads and having a bearing portion and annular holding members having inwardly turned edges respectively engaging the lips of the locking member and the outturned edges of the shield.

In testimony whereof I affix my signature.

WILLIAM H. MANUEL. [L. S.]